United States Patent Office 3,233,398
Patented Feb. 8, 1966

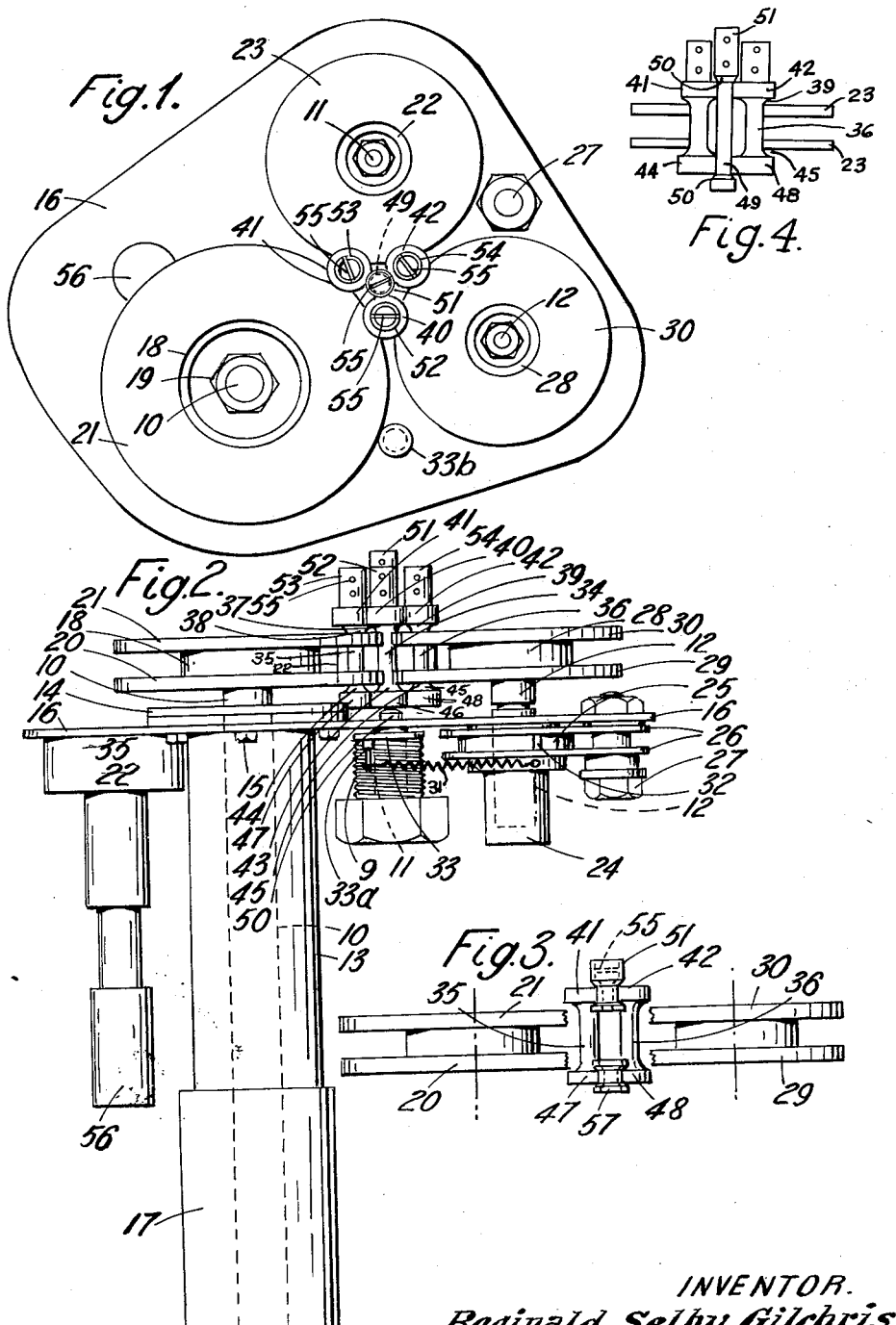

3,233,398
HIGH SPEED DRIVING TRANSMISSIONS
FOR SPINDLES
Reginald Selby Gilchrist, London, England, assignor to
The Klinger Manufacturing Company Limited, London,
England, a company of Great Britain
Filed Sept. 13, 1963, Ser. No. 308,739
2 Claims. (Cl. 57—103)

This invention relates to high speed driving transmissions for spindles particularly for spindles employed for false twisting yarns.

According to this invention a driving transmission for a spindle comprises inner and outer sets of parallel rotatable shafts, the shafts in each set being grouped around and parallel to the spindle, friction gearing between the shafts of the outer set and the shafts of the inner set and between the shafts of the inner set and the spindle and which friction gearing comprises two friction tracks of different diameter on each shaft of the inner set, the larger diameter friction tracks on the shafts of the inner set engaging said spindle and the smaller diameter tracks being engaged by larger diameter friction tracks on the shafts of the outer set whereby compound step up friction gearing is provided between the outer set of shafts and the spindle, and means for driving at least one of the shafts of the outer set.

By inner and outer parallel rotatable shafts is meant an arrangement in which the axes of the inner shafts are arranged within a space bounded by planes containing the axes of pairs of adjacent outer shafts.

In order to obtain a further step of speed of the spindle, the part of it which is engaged by the friction tracks on said inner set of shafts is of smaller diameter than those of said tracks.

In a preferred arrangement there are three shafts in each set which shafts are so disposed that the smaller diameter tracks on each shaft of an inner set is engaged by the friction tracks on two of the shafts of the outer set.

The arrangement of friction gearing may be repeated along the axes of said shafts of the inner and outer sets so that a number of larger diameter tracks are provided on each shaft of the inner set which either engage said spindle at locations spaced apart along its length or one larger diameter track on each shaft of an inner set engages the spindle and the other larger diameter tracks engage one or more spacing elements separate from and co-axial with said spindle.

The shafts of the inner set may be supported and located solely by reason of engagement of their friction tracks with the tracks on the shafts of the outer set and said spindle and said one or more spacing elements when such are provided, is or are located solely by reason of engagement with the friction tracks on the shafts of the inner set.

Each shaft of an outer set may be provided with two axially spaced friction tracks and each shaft of an inner set is provided with axially spaced pairs of different diameter tracks and with two axially spaced shoulders between which are disposed the axially spaced friction tracks of a shaft of the outer set whereby axial movements of the shaft of the inner set are limited with respect to the shafts of the outer set and said spindle is formed with two axially spaced shoulders between which are located the two larger diameter tracks on each shaft of the inner set whereby axial movement of the spindle with respect to the shafts of the inner set is limited.

The shafts of the outer set may be so mounted in bearings as to be fixed against axial movement.

Two of the bearings for two of the shafts of the outer set may be fixed in relation to one another and the bearing for the third shaft is mounted so as to be movable towards and away from the other two and means are provided for resiliently pressing it in the former direction whereby all the friction tracks are maintained in engagement.

The aforesaid spindle and/or any of said shafts of the inner set is or are so formed as to be capable of imparting twist to the yarn, thus a number of yarns may be twisted simultaneously the twists imparted by the spindle being in opposite sense to the twists imparted by the shafts when both the shafts and spindle are utilized for twisting.

The invention is particularly applicable to the false twisting and crimping of thermoplastic yarn in which case means are provided for heating the yarn before reaching the means which impart twist to it and means are provided for preventing the twists in the yarn from running back from the heating means to the supply bobbins for the yarn.

The above features and other features of the invention are set out in the accompanying description of a transmission suitable for use in a false twisting apparatus reference being made to the accompanying drawing in which:

FIGURE 1 is a plan view of one form of transmission;

FIGURE 2 is a side elevation of the transmission looking from the underside of FIGURE 1;

FIGURE 3 is a side elevation of a part of a similar transmission showing an alternative manner of supporting the spindle, one of the outer and one of the inner sets of shafts being omitted; and FIGURE 4 shows in elevation the cooperation between a spindle and friction gearing of the invention.

The transmission comprises an outer set of three shafts 10, 11, 12.

The shaft 10 is mounted in a needle bearing contained in a bearing housing 13 having a flange 14 which is secured by screws 15 to a supporting plate 16 so that the housing extends below the plate. The shaft 10 extends below the housing 13 and has fixed to it a belt pulley 17.

The upper end of the shaft extends above the flange 14 and has a hub 18 clamped against a shoulder thereon by a nut 19 which engages a threaded extremity of the shaft. The hub has fixed to opposite ends thereof two axially spaced discs 20, 21 formed from the polyurethane rubber which thus provide two friction tracks.

The shaft 11 is mounted in a plain bearing within a housing 9 fixed to the supporting plate 16. The shaft extends above the plate 16 and has secured to it a hub 22 having fixed on opposite ends thereof two friction discs 23 of similar material to that of discs 20, 21 but of smaller diameter only one of which appears in FIGURE 1 of the drawing.

The shaft 12 is mounted in a ball or roller bearing within a housing 24 provided with a flange 25 clamped by a nut between two lever arms 26 which are pivotally mounted on a stud 27 fixed to the plate 16. The stud is shown in FIGURE 2 in a different position to that of FIGURE 1 for convenience. The plate 16 is provided with an aperture through which the shaft 12 extends and is of such a size as to permit the swinging movement of the shaft.

The shaft 12 has a hub 28 fixed to it, to opposite ends of which hub are secured friction discs 29, 30. A tension spring 31 is connected at one end to a pin 32 fixed to the lever arms 26 and is connected at the other end to a pin 33a on an anchorage member 33 which is adjustably mounted by means 33b (FIGURE 1) on the plate 16 so that the tension in the spring may be varied. The arrangement is such that the friction discs 29, 30 are drawn towards the other pair of discs 20, 21 and the pair 23 but may be swung clear of them.

Arranged within the space bounded by planes containing the axes of the shafts 10, 11 and 11, 12 and 12, 10 is an inner set of hollow shafts 34, 35, 36 as best seen in FIGURE 2.

A friction track on the shaft 34 which is provided by the shaft itself is engaged by the pairs of friction discs 21, 20 and 29, 30. A friction track on the shaft 35 is engaged by the pairs of discs 20, 21 and the two discs 23. A friction track on the shaft 36 is engaged by the pair of discs 23 and 29, 30. The shafts 34, 35, 36 are formed near their upper ends with tapered shoulders 37, 38, 39, respectively, which rest on the upper edges of the friction discs 21, 23, 30 and the shafts have secured to them above the shoulders three friction discs 40, 41, 42 respectively, which are of larger diameter than the diameters of the shafts but are considerably smaller than the diameter of the friction discs on the shafts 10, 11, 12.

The lower ends of the shafts 34, 35, 36 are provided with tapered shoulders 43, 44, 45, respectively, which underlie the lower edges of the discs 20, 23, 29 so that the shafts 34, 35, 36 can only have a limited degree of vertical movement. The lower ends of the shafts have fixed to them friction discs 46, 47, 48 of the same diameter as the discs 40, 41, 42.

The friction discs 40, 41, 42 and the friction discs 46, 47, 48 engage a part of a hollow spindle 49 at locations around its circumference and which spindle is formed with axially spaced conical shoulders (only one of which can be seen at 50 FIGURE 2) between which the friction discs 40, 41, 42 and 46, 47, 48 are located, whereby the axial movement of the spindle is limited.

The above relationship between the spindle 49, the pair of inner shafts 35 and 36, and the pair of friction discs 23 is illustrated in FIG. 4.

In the drawing the diameter of the parts of the spindle which are engaged by the friction discs on the shafts 34, 35, 36 is considerably smaller than that of said discs but could be equal to that of the discs.

The upper end of the hollow spindle is formed with an enlarged cup shaped part 51 across which extends one or more bails 55 in known manner.

It will be appreciated with the above arrangement that due to the shafts of the inner set each having different sized diameters where they are engaged respectively by the large friction discs on the outer set of shafts and by the spindle, a considerable step up of rotation between the rotation of the outer set of shafts and spindle may be obtained.

The hollow inner sets of shafts 34, 35, 36 may also be provided at their upper ends beyond the friction discs 40, 41, 42 with cup shaped parts 52, 53, 54 also provided with cross bails 55 in which case the diameter of the parts of the spindle engaged by the friction discs may be of the same size as those of the discs.

As indicated earlier the above arrangements are particularly applicable to a false twisting and crimping apparatus. The thermoplastic yarn passes from one or more supply bobbins over or through a heater and then through the hollow spindle and/or any of the hollow shafts, wound around the cross bail or bails and thence passes to winding apparatus. Means are provided for preventing the twist in the yarn from the heating means from feeding back to the bobbin or bobbins. It will be appreciated in the case where the hollow spindle and one or more of the hollow shafts are provided with cross bails the yarn passing through each of the hollow shafts will be false twisted in the opposite sense to a yarn passing through the hollow spindle. Thus two or more yarns may be false twisted simultaneously in the one apparatus with the same number of twists per inch.

As will be seen the diameters of the friction discs 40, 41, 42 and 46, 47, 48 are larger than the diameters of the spindle and thus when the shafts of these discs and the spindle are provided with means for twisting the yarn the twists imparted by the shafts will be less than that imparted by the spindle. Alternatively the diameters of the inner shafts may be the same as that of the spindle in which case the twists imparted to all the yarns is the same. A suitable aperture is formed in the supporting plate through which the various yarns may pass.

The supporting plate has fixed to it a pillar 56 which is secured in a socket in the main frame of a false twist crimping machine not shown. A number of such assemblages may be mounted side by side along the length of the machine above yarn supply bobbins and the various pulleys 17 may be engaged by one and the same stretch of an endless belt.

Instead of the two sets of friction discs 40, 41, 42 and 46, 47, 48 both engaging the spindle only the first said set may engage it as shown in FIGURE 3 whereas the other set engage on annular distance piece 57. In this form of device the spindle is of sufficient length only to carry the bale, engage the rollers 40, 41 and 42 and have a small collar at its lowermost end to retain it in place against axial movement. The distance piece 57 comprises merely a hollow body bearing on its outside surface a suitable track for engaging the friction discs 46, 47 and 48. It must, of course, be provided with a central bore for passage of yarn to the spindle. It serves merely to hold the friction discs in proper relationship, that is, to prevent radial displacement of the wheels 46, 47 and 48.

It will be appreciated that other modifications may be made for example instead of the swinging shaft 12 being provided with two friction discs it may be provided with a single disc disposed centrally with respect to the discs on each of the other shafts 10 and 11 and which single disc engages the shafts 34, 36.

Also instead of the friction discs 21, 23, 30 being in one plane they may be in different planes and partly overlap one another also instead of the discs 20, 23 and 29 also being in one plane they might be in different planes and partly overlap one another.

With the above arrangements the spindles may be driven at speeds up to 400,000 revolutions per minute or over.

I claim:

1. A driving transmission for a spindle comprising inner and outer sets of parallel rotatable shafts, the shafts in each set being grouped around and parallel to the spindle, friction gearing between the shafts of the outer set and the shafts of the inner set and between the shafts of the inner set and the spindle and which friction gearing comprises two friction tracks of different diameter on each shaft of the inner set and friction tracks on the shafts of the outer set of a larger diameter than either of said two friction tracks of different diameter on each shaft of said inner set, the larger diameter friction tracks on the shafts of the inner set engaging said spindle and the smaller diameter tracks being engaged by said larger diameter friction tracks on the shafts of the outer set whereby compound step up friction gearing is provided between the outer set of shafts and the spindle, and means for driving at least one of the shafts of the outer set.

2. A driving transmission according to claim 1 wherein the part of the spindle engaged by the friction tracks on said inner set of shafts is of smaller diameter than said tracks.

References Cited by the Examiner
UNITED STATES PATENTS 2,855,750 10/1958 Schrenk et al. _____ 57—77.3
2,951,387 9/1960 Cox.
3,040,511 7/1962 Gilchrist et al. _____ 57—77.45
3,115,743 12/1963 Brodtmann _____ 57—77.45

FOREIGN PATENTS 848,971 9/1960 Great Britain.
927,981 6/1963 Great Britain.
932,206 7/1963 Great Britain.
606,717 7/1960 Italy.

MERVIN STEIN, Primary Examiner.